Figure 1:
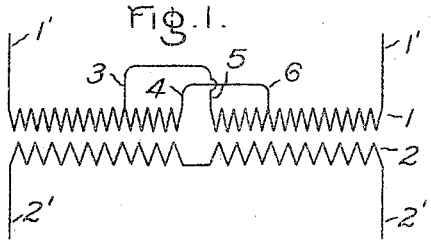

W. S. MOODY.
METHOD AND MEANS FOR THE OPERATION OF ELECTRICAL APPARATUS.
APPLICATION FILED FEB. 27, 1915.

1,291,078.

Patented Jan. 14, 1919.

Witnesses:
Earl B. Klock.
J. Ellis Glen

Inventor:
Walter S. Moody,
by Albert G. Davis
His Attorney.

UNITED STATES PATENT OFFICE.

WALTER S. MOODY, OF PITTSFIELD, MASSACHUSETTS, ASSIGNOR TO GENERAL ELECTRIC COMPANY, A CORPORATION OF NEW YORK.

METHOD AND MEANS FOR THE OPERATION OF ELECTRICAL APPARATUS.

1,291,078. Specification of Letters Patent. Patented Jan. 14, 1919.

Application filed February 27, 1915. Serial No. 11,114.

*To all whom it may concern:*

Be it known that I, WALTER S. MOODY, a citizen of the United States, residing at Pittsfield, county of Berkshire, State of Massachusetts, have invented certain new and useful Improvements in Methods and Means for the Operation of Electrical Apparatus, of which the following is a specification.

My invention relates to an improved method and means for the operation of electrical apparatus provided with windings and adapted to be operated at different voltages, and has for its object the prevention of injury to such apparatus that may arise from electrical surges and the like occurring in the same.

While I have described my invention as applied to an electrical transformer, it will be understood that my invention is not limited to electrical transformers but may be applied to other types of electrical apparatus having windings in which electrical surges may be set up.

More specifically my invention relates to electrical transformers or the like which have a winding and which are adapted to operate at one voltage with substantially the entire winding connected in series and at a different voltage or voltages with only a section or sections of the winding connected in series.

As such transformers or apparatus have usually been operated and connected in the past, when only a section or sections of the winding have been employed, it has been customary to leave the remaining section or sections of the winding "open ended" or incompletely connected to the circuit to which such transformer or apparatus is connected, or completely disconnected therefrom. The power current will then not flow through these sections. It has been found that with such connections when surges and the like are set up in the circuits to which the apparatus is connected or in the apparatus itself, such apparatus is especially liable to be injured at these incompletely connected sections. Such injury usually arises from the breaking down of the insulation about such sections.

While I do not wish to limit myself to any definite theory as to why it is that such injury is apt to occur in such sections of the winding, I believe that the reason why these sections are peculiarly liable to injury is that the sections of the winding left open or incompletely connected will take a leading current sufficient to charge them and to set up an electrostatic field around them. Such sections may, therefore, be likened to a condenser. There will be no power current in them. The presence of the power current in the other sections of the windings through which it flows and having reactance instead of capacity may cause a partial resonance in the windings and thus the voltage may be increased beyond that for which the insulation of the windings is designed and the insulation may, therefore, break down.

Another reason for such injury may be that if a surge enters the winding through one of the terminals by which it is connected to the circuit, the surge will travel along the winding, both through the connected and the incompletely connected sections of it, and will be reflected from the unconnected ends of such sections. This reflection may be of such a character that the reflected voltage will be at a phase displacement of 180 degrees from the impressed voltage of the surge so that the voltage upon the winding will be doubled and thus may become sufficient to break down the insulation. Or, if the portions of the winding be insulated from each other so that a section or sections of the winding are not in any way connected to the circuit, that is are completely disconnected from it, a surge may enter the sections of the winding connected to the circuit and thus induce an electrostatic charge on the disconnected sections. The charge in such section or sections will not be dissipated as rapidly as it will be dissipated in the sections of the winding connected to the circuit. Therefore, subsequent charges due to the surge or surges may be cumulative in these disconnected sections of the winding, and, if such cumulative effect be sufficiently repeated, the potential to ground in these sections of the winding may become excessive and thus break down the insulation of the same.

The object of my invention is to prevent such injury or break-down of the insulation, and I accomplish this object by connecting sections of the winding in parallel and in series with the other sections of the winding so that no section of the winding will be incompletely connected to the circuit or completely disconnected therefrom and the power current will flow through all the sections of the winding.

The novel features of my invention are pointed out with more particularity in the claims annexed to and forming a part of this specification.

Figure 2:
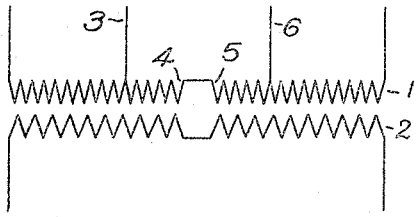
Figure 3:
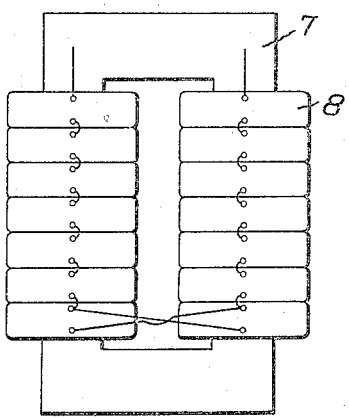
Figure 4:
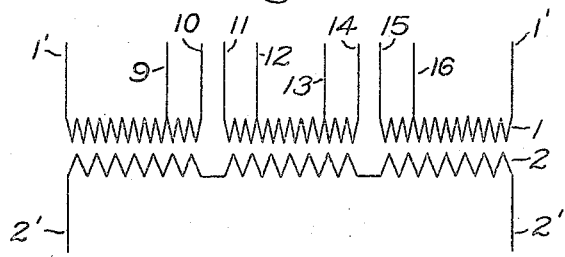

For a further understanding of my invention reference may be had to the accompanying drawings, where Figure 1 shows diagrammatically the windings of a transformer connected in accordance with my invention; Fig. 2 shows diagrammatically the windings of a transformer with the windings all connected in series; Fig. 3 shows a transformer connected in accordance with my invention, and Fig. 4 shows a modification of Fig. 1.

Referring first to Fig. 1, 1 is the high voltage winding of a transformer and 2 the low voltage winding, these windings being connected by conductors 1' and 2' to their respective circuits in the usual manner. The high voltage winding is shown as divided into sections by taps 3, 4, 5 and 6, each section consisting of a plurality of turns. As shown in the figure, taps 3 and 5 are connected together and taps 4 and 6 are connected together so that a plurality of the sections of the winding are connected in parallel and in series with the remaining sections of the winding. The power current will, therefore, flow through all sections of the winding.

It will be obvious that the connections made as shown are for the operation of the transformer with a certain voltage.

If it is desired to operate the transformer at a different voltage, all of the turns of the high voltage winding may be connected in series by connecting the taps 4 and 5 as shown in Fig. 2.

It will be obvious from an inspection of Fig. 1 that the power current will flow through the entire high voltage winding 1 and that there will be no sections of the same incompletely connected to the circuit, as is the case if the transformer were connected by the old method of connecting taps 3 to 6 and thus leaving taps 4 and 5 unconnected and the sections of the winding between 3 and 4, and 5 and 6, open-ended or incompletely connected to the circuit.

It will be understood that while I have only shown two taps as connected to the high voltage winding 1 and dividing it into a plurality of sections, that if desired any number of taps may be used, and taps may also be connected to the low voltage winding 2.

Fig. 3 shows diagrammatically a transformer connected in accordance with my invention, the transformer comprising a core 7 and a plurality of coils 8 surrounding the legs of the core. The lower coils surrounding each leg are connected in parallel and in series with the remaining coils. The low voltage coils are not shown in the figure but may be wound and connected in the usual manner.

In the modification as shown in Fig. 4 the high voltage winding is divided into three main sections. If it is desired to operate the transformer at one voltage with all of the coils or all of the sections of the winding in series, the taps 10 and 11 and 14 and 15 are respectively connected together. If it is desired to operate the transformer at a different voltage, taps 9 and 11, 10 and 12, 13 and 15, and 14 and 16 are connected together so that the winding will be connected with a plurality of sections or all the sections of the winding between the taps 9 and 10, 11 and 12, 13 and 14, and 15 and 16 connected in parallel and in series with the remaining sections of the winding.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of operating at different voltages, electrical apparatus adapted to be operated with alternating current and having a winding, which consists in connecting all the turns of the winding in series for one voltage, and connecting parts of said winding in parallel with each other and such paralleled parts in series with the remainder of the winding for any different voltage including the greatest variation from the first mentioned voltage.

2. A transformer comprising a winding divided into sections, some of said sections being permanently connected in series to carry the whole current of the winding, and means for connecting other sections of said winding in series with each other and the permanently connected sections for one voltage, and in parallel with each other and in series with the permanently connected sections for any different voltage.

In witness whereof, I have hereunto set my hand this 19th day of Feb., 1915.

WALTER S. MOODY.

Witnesses:
CHARLES R. BLAKELY,
ROBERT B. O'BOYLE.